Patented June 29, 1937

2,085,401

UNITED STATES PATENT OFFICE 2,085,401

VULCANIZING ACCELERATOR AND METHOD

Douglas Frank Twiss, Wylde Green, Sutton Coldfield, and Frederick Arthur Jones, Birmingham, England, assignors to Dunlop Tire and Rubber Corporation, Buffalo, N. Y., a corporation of New York No Drawing. Application March 31, 1931, Serial No. 526,766. In Great Britain April 23, 1930

10 Claims. (Cl. 18—53)

This invention relates to improvements in the manufacture of vulcanized rubber compositions and particularly to the use of accelerators of vulcanization.

More particularly it relates to improvements in certain types of accelerators such as the mercaptobenzothiazoles, dithiocarbamates and xanthates and their respective analogues.

Objects of the present invention are to provide accelerators of the above type of compounds or combining the above compounds but having greater stability during storage and against oxidation and having a less tendency to scorching during vulcanization, and which are, therefore, more constant in composition and relatively free from unpleasant taste and from harmful effects. The accelerators of the present invention also possess low melting points and mix uniformly with rubber and form good colloidal dispersions in water.

Other and further objects of the invention are to provide improved methods of vulcanization by the favorable modification of accelerators of the above type and their application to vulcanization; and to provide vulcanized goods of improved quality.

According to the present invention a carboxyl group is substituted in mercaptobenzothiazoles, dithiocarbamates, and xanthates and their respective analogues to produce solid reaction products which exert excellent accelerating effects on the vulcanization.

This substitution is accomplished by the interaction of compounds of the above type or their alkali metal derivatives with the esters of halogen substituted derivatives of formic acid such as chloro-formic esters, bromo-formic esters, chloracetic esters, etc.

Examples of the method of preparation of such compounds are as follows:

*Example I*

8.35 grams of mercaptobenzothiazole and 2.8 grams potassium hydroxide are dissolved in 100 ccs. alcohol and the mixture boiled under a reflux condenser until the mercaptobenzothiazole has completely dissolved. 5.45 grams (4.8 cc.) of ethyl chloroformate dissolved in 100 ccs. alcohol is added to the alcoholic solution of the potassium salt and the mixture refluxed. Potassium chloride separates out and after boiling the mixture for about 90 minutes it is poured into 500 ccs. of cold water. A yellow solid is precipitated and is filtered off at the pump, washed free from potassium chloride with cold water, drained and then dried in vacuo.

The dried solid has a melting point of about 55° C. and the yield is about 60% of the theory. The solid is probably carbethoxy benzthiazyl sulphide.

The following chemical equation illustrates the process herein defined—

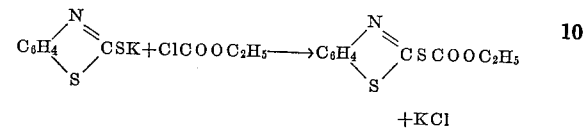

+KCl

A mix containing—

| | Parts by weight |
|---|---|
| Rubber | 100 |
| Sulphur | 5 |
| Zinc oxide | 5 | was made up and quantities of 1 gram and 0.75 gram of the carbethoxybenzthiazyl sulphide mixed into separate portions of the rubber mixing. On heating to 128° C. for 60 minutes a well vulcanized rubber was obtained in each case.

*Example II*

11 grams of diethylammonium diethyldithiocarbamate are dissolved in 100 ccs. ethyl-alcohol and 2.8 grams potassium hydroxide in alcoholic solution are added. The mixture is boiled under a reflux condenser for twenty minutes when 5.45 grams (4.8 cc.) ethyl chloroformate are added and the mixture then refluxed for one hundred and twenty minutes. The solution becomes yellow in colour and potassium chloride is precipitated out.

After boiling the solution is poured into an excess of cold water and a yellow oil separates which solidifies on standing overnight to a yellow crystalline solid. The solid is filtered off, well washed with distilled water and dried at 100° C. The yellow oil so obtained solidifies rapidly on cooling. The melting point is approximately 60° C.

The yellow solid is probably carbethoxy diethylaminothioformyl sulphide.

The following chemical equation illustrates the process herein described—

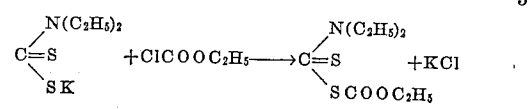

The compound was mixed into a rubber stock containing—

| | Parts by weight |
|---|---|
| Rubber | 100 |
| Sulphur | 5 |
| Zinc oxide | 5 | in quantities of ½% and 1%.

The mix containing 1% of the accelerator was cured at 128° C. for sixty minutes and was considerably overcured.

The mix containing ½% of the accelerator was cured for thirty minutes at 128° C. and this mix was also overcured. Although this compound appears to be a rapid accelerator, no scorching was observed during the mixing operation, although the rolls were not specially cooled.

*Example III*

12.3 grams of piperidine piperidine-1-carbothionolate and 2.8 grams potassium hydroxide are dissolved in 50 ccs. water and the solution boiled until piperidine is no longer evolved. 200 ccs. alcohol containing 5.45 (4.8 cc.) ethylchloroformate in solution is added and the mixture boiled for one hour. The potassium chloride which separates out is filtered off in a hot water funnel and the dark brown solution evaporated to a dryness. A dark brown pasty mass of low melting point is obtained which is insoluble in water and has a neutral reaction to litmus.

Mixed into a stock of the following ingredients—

| | Parts by weight |
|---|---|
| Rubber | 100 |
| Sulphur | 5 |
| Zinc oxide | 5 | of the compound gave a good vulcanizate after curing at 128° C. for one hour. The substance is probably carbethoxy piperidylthio-formyl sulphide.

The following chemical equation illustrates the process herein defined—

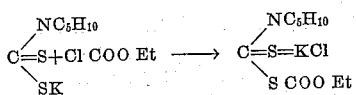

*Example IV*

8.7 grams of potassium isopropyl xanthate is dissolved in 200 ccs. alcohol and boiled under reflux while 5.45 grams (4.8 ccs.) of ethyl chloroformate is added. The mixture is boiled for one hour and then poured into 500 ccs. of cold water. A heavy yellow oil is precipitated and is washed free from soluble chlorides by decantation. The oil separated from water as completely as possible and dried at 100° C. is clear, yellow and non-viscous and mixes easily and rapidly into rubber and appears to be very soluble in rubber.

The compound is probably carbethoxy isopropylthioformyl sulphide.

The following chemical equation illustrates the process herein defined—

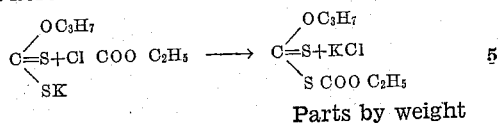

| | Parts by weight |
|---|---|
| A mix of rubber | 100 |
| Sulphur | 5 |
| Zinc oxide | 5 | with 1% of the compound was mixed on an uncooled roller mill, no scorching of the mix was detected. On curing for sixty minutes at 108° C. a good vulcanizate was obtained.

The yellow oil on standing crystallized in part depositing large yellow crystals which melted sharply at 55° C. and were found to be isopropylxanthogen mono-sulphide.

These crystals acted as a fast accelerator for rubber sulphur mixtures but the yellow uncrystallizable oil as seen above was also a fast accelerator and in addition milled into rubber very easily.

*Example V*

A solution of 5.6 grams potassium hydroxide and 9.45 grams monochloracetic acid in alcohol are prepared and added to 22.3 grams of the potassium salt of mercaptobenzthiazole also in alcoholic solution. The mixture which at first is quite clear, after standing for a short time becomes turbid and deposits large quantities of a bulky white solid. The solid is filtered off, washed with alcohol and dried at 100° C. This white solid is dissolved in water in which it is freely soluble and excess of a solution of zinc chloride in water is added. The white precipitated zinc salt is filtered, washed with water until free from soluble chlorides and dried in vacuo. The solid is assumed to be the zinc sulphobenzthiazyl acetate formed according to the reactions—

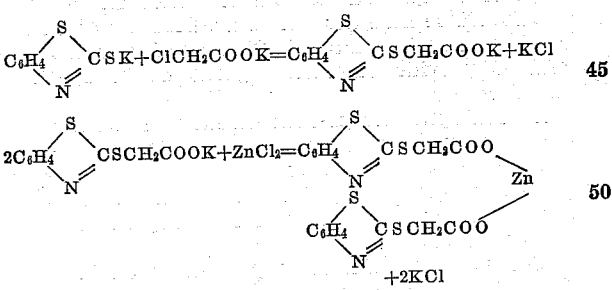

The zinc salt melts sharply at 152° C.
A mixing of—

| | Parts by weight |
|---|---|
| Rubber | 100 |
| Sulphur | 5 |
| Zinc oxide | 5 |
| Zinc salt | 2 | was prepared and heated to 138° C. for sixty minutes. A well vulcanized rubber was obtained.

What we claim is—

1. Carbethoxybenzthiazylsulphide.
2. A method of vulcanizing rubber which comprises heating a rubber with sulphur and carbethoxybenzthiazylsulphide.
3. A vulcanization accelerator having a mercaptobenzothiazole combined through its sulphur atom with a carbon atom in the acid group of a compound of a saturated fatty acid having not over two carbon atoms.
4. A vulcanization accelerator having a mercaptobenzothiazole combined through its sulphur atom with a carbon atom in the acid group of a salt of a saturated fatty acid having not over two carbon atoms.

5. A vulcanization accelerator having a mercaptobenzothiazole combined through its sulphur atom with a carbon atom in the acid group of an ester of a saturated fatty acid having not over two carbon atoms.

6. A vulcanization accelerator having a mercaptobenzothiazole combined through its sulphur atom with the carboxyl carbon atom of a compound of formic acid.

7. A vulcanization accelerator having a mercaptobenzothiazole combined through its sulphur atom with the carboxyl carbon atom of a formic acid ester.

8. A method of vulcanizing rubber which comprises heating a rubber composition with sulphur and a vulcanization accelerator having mercaptobenzothiazole combined through its sulphur atom with a carbon atom in the acid group of a compound of a saturated fatty acid having not over two atoms.

9. A method of vulcanizing rubber which comprises heating a rubber composition with sulphur and a vulcanization accelerator having mercaptobenzothiazole combined through its sulphur atom with the carboxyl carbon atom of a formic acid ester.

10. A method of vulcanizing rubber which comprises heating a rubber composition with sulphur and a vulcanization accelerator having mercaptobenzothiazole combined through its sulphur atom with a carbon atom in the acid group of an ester of a saturated fatty acid having not over two carbon atoms.

DOUGLAS FRANK TWISS.
FREDERICK ARTHUR JONES.